United States Patent Office 3,746,747
Patented July 17, 1973

3,746,747
PRODUCTION OF OXYGENATED ORGANIC
COMPOUNDS
Donald G. Kuper and William B. Hughes, Bartlesville,
Okla., assignors to Phillips Petroleum Company, Bartlesville, Okla.
No Drawing. Continuation-in-part of application Ser. No. 652,042, July 10, 1967. This application Jan. 26, 1971, Ser. No. 109,971
Int. Cl. C07c 69/52
U.S. Cl. 260—485 R
6 Claims

ABSTRACT OF THE DISCLOSURE

Olefinically unsaturated compounds containing at least two carbon to carbon double bonds in conjugation are converted to esters by contacting with carbon monoxide and an alcohol containing up to 3 hydroxyl groups in the presence of a bridged organo dirhodium complex catalyst. The esters produced have utility in the production of polymers.

---

This is a continuation-in-part application of our copending application having Ser. No. 652,042, filed July 10, 1967, now abandoned.

This invention relates to the production of oxygenated organic compounds. In another aspect, this invention relates to the production of unsaturated esters from polyolefins reacted with carbon monoxide and at least one hydroxylic compound. In accordance with a further aspect, this invention relates to production of olefinically unsaturated esters from polyolefinic compounds in the presence of a bridged organo dirhodium complex catalyst.

The reaction of olefinic hydrocarbons with carbon monoxide and water or alcohols to form carbonyl compounds provides a route to numerous valuable products not readily available otherwise. Catalysts are usually employed to promote this reaction. When water is used, one of the products is an acid, while the use of alcohols leads to the formation of esters. Among the catalysts formerly employed are complexes formed from Group VIII$b$ metals and a biphyllic ligand containing a trivalent Group V$a$ element, as disclosed by Lynn H. Slaugh in U.S. Pat. 3,168,553. In a heterogeneous system, inorganic salts of Group VIII metal elements on various supports have been used.

Specific Group VIII noble metal chelates, metallic rhodium and certain organic and inorganic compounds thereof have been shown to be operative in related applications as disclosed by Thomas Alderson and John Cunningham Thomas in U.S. Pat. 3,040,090 and by James Bryan Zachry and Clyde Lee Aldrige in U.S. Pat. 3,161,672. The general makeup and structure of these different catalysts are known to greatly influence their activity toward reactant materials as well as the nature and distribution of products obtained. In this regard there are no discernible criteria or specifications by which to determine the essential qualities of any of these catalysts, or, for that matter, which combinations and/or structures of metals, inorganic and organic constituents will effect a desired result.

It is, therefore, one object of this invention to provide a process for the conversion of olefins to oxygenated compounds.

It is another object of this invention to provide a unique process for the production of mono- and diesters from olefinically unsaturated hydrocarbons.

Another object is to produce unsaturated esters useful as plasticizers in plastics fabrication and as organic synthesis intermediates by the use of a novel process.

Other objects and aspects as well as the several advantages of the invention will be apparent to those skilled in the art upon a study of the specification and the appended claims.

In accordance with the invention, a method is provided for producing oxygenated compounds comprising olefinically unsaturated mono- and diesters from compounds containing at least two carbon to carbon double bonds, at least two of which are conjugated, by contacting at least one of said compounds with carbon monoxide and at least one hydroxylic compound selected from the group consisting of alcohols of the formula $R(OH)_m$, wherein R is a saturated hydrocarbyl or aryl-substituted saturated hydrocarbyl radical, e.g., alkyl, cycloalkyl, alkylcycloalkyl, cycloalkylalkyl, aralkyl, arylcycloalkyl, alkylene, cycloalkylene, alkanetriyl, or cycloalkanetriyl radical, having a valence equal to $m$, and $m$ is selected from 1, 2 and 3, in the presence of a bridged organo dirhodium complex catalyst. The number of carbon atoms in R is equal to at least $m$ and can be as high as 20 or more.

Some examples of applicable alcohols represented by the formula $R(OH)_m$ include: ethylene glycol, propylene glycol, methanol, ethanol, 1-propanol, 2-propanol, 2-methyl-1-propanol, 1-butanol, 2-butanol, 1-pentanol, 2-ethyl-1-hexanol, 1-octanol, 1-decanol, 1-dodecanol, cyclopentanol, cyclohexanol, cyclododecanol, 3-methylcyclopentanol, 2-cyclohexylethanol, 1-octadecanol, 1-eicosanol, benzyl alcohol, glycerol, 1,4-butanediol, 1,10-decanediol, mixtures thereof, and the like. The monohydric alcohols are especially useful in the practice of this invention.

Polyolefinic compounds containing 2 to 4 double bonds, at least two of which are conjugated, suitable for the practice of this invention include: 1,3-butadiene, isoprene, 1,3-pentadiene, 1,3,7-octatriene, 1,3,7-dodecatriene, 1,3-octadiene, 1,3,5-heptatriene, 1,3,7,11-dodecatetraene, 1,3-cyclododecadiene, 1,3-eicosadiene, mixtures thereof, and the like.

The bridged organo dirhodium complex catalyst of the invention has the general formula

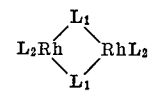

wherein $L_1$, the bridging ligand, is selected from the group consisting of thiocyanato, arenethiolato preferably containing from 6 to 10 carbon atoms, alkanethiolato preferably containing from 1 to 6 carbon atoms, oxalato, acetato, propionato, acetylacetanato, cyano, cyanato, and halo including chloro, bromo, and iodo. The bridging ligand should be anionic. The external complex-forming ligands, $L_2$, are generally neutral, bidentate coordinating ligands, or two monodentate neutral ligands.

$L_1$ is preferably selected from acetato, propionato, chloro, bromo, and iodo, and $L_2$ is preferably selected from carbon monoxide and olefinic hydrocarbons containing from 2 to 12 carbon atoms.

Examples of the external complex-forming ligands include carbon monoxide, triaryl and trialkyl -phosphines, -arsines, or -stibines, and olefinic hydrocarbons containing from 2 to about 12 carbon atoms such as ethylene and propylene, di- and triolefins such as 1,3-butadiene, 1,4-hexadiene, 1,3,5-octatriene, and 2,4-heptadiene, and cyclic di- and triolefins such as 1,3-cyclopentadiene, dicyclopentadiene, 1,5-cyclooctadiene, 1,5,9-cyclododecatriene, and 1,3,5-cycloheptatriene.

These catalysts are bridged rhodium (I) complexes having a square coplanar configuration wherein each rhodium atom has a coordination number of four. The preparation of certain species of these catalysts is illustrated by Chatt and Venanzi in Journal of the Chemical Society, 4735–4741 (1957).

Representative examples of these catalysts are bis(1,5-cyclooctadiene)-μ,μ'-diacetatodirhodium having the structure

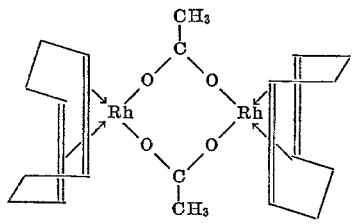

rhodium carbonyl chloride having the structure

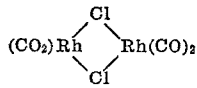

and bis(1,5-cyclooctadiene)-μ,μ'-dichlorodirhodium having the structure

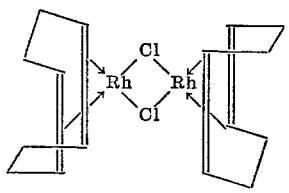

Some examples of other applicable catalysts include:

bis(1,5-cyclooctadiene)-μ,μ'-dibromodirhodium,
bis(1,5-cyclooctadiene)-μ,μ'-diiododirhodium,
bis(1,3-cyclopentadiene)-μ,μ'-dicyanodirhodium,
bis(ethylene)-μ,μ'-dicyanatodirhodium,
bis(1,3,5-octatriene)-μ,μ'-dipropionatodirhodium,
bis(triphenylphosphine)-μ,μ'-dibenzenethiolatodirhodium,
bis(1,3-butadiene)-μ,μ'-dimethanethiolatodirhodium,
bis(1,5,9-cyclododecatriene)-μ,μ'-bis(acetylacetonator)dirhodium,
bis(dicyclopentadiene)-μ,μ'-dichlorodirhodium,
bis(dicyclopentadiene)-μ,μ'-dioxalatodirhodium, mixtures thereof, and the like. Applicable catalysts can be prepared by methods known in the art, e.g., by direct interaction of a rhodium (III) halide with the appropriate complexing substance or by a ligand exchange reaction.

Examples of the reactions which characterize the formation of a monoester or a diester from a diolefin and a monohydric alcohol are represented by the following equations:

$C_nH_{2n-2} + R'''OH + CO \rightarrow R'''OOCC_nH_{2n-1}$ (isomers)
$C_nH_{2n-2} + R'''OH + CO \rightarrow (R'''OOC)_2C_nH_{2n-2}$ (isomers)

in which n is an integer from 4 to 20 or more, and R''' is a monovalent hydrocarbon radical such as an alkyl, aralkyl, or cycloalkyl radical containing generally from about 1 to about 20 carbon atoms or more. In a preferred embodiment, one of the double bonds is in the alpha position and the other in conjugation with it. The olefinically monounsaturated mono- and diester isomers can be hydrogenated by known methods to the corresponding saturated mono- and diesters.

Examples of some monoesters and diesters which can be produced from polyolefins in accordance with this invention include:

methyl 3-pentenoate,
methyl 4-pentenoate,
isopropyl 4-methyl-3-pentenoate,
cyclohexyl 3,7-nonadienoate,
1,4-dicarbomethoxy-2-butene,
1,4-dicarbomethoxy-1-butene,
1,4-bis(carbohexyloxy)-2-pentene,
3,12-bis(carbobenzyloxy)cyclododecene,
1,4-bis(carbeicosyloxy)-2-eicosene,
1,4-dicarbethoxy-2,7,11-dodecatriene, and the like.

Solvents are not required since the alcohol used will dissolve the catalyst. Benzene, toluene, chlorobenzene, saturated hydrocarbons such as hexane, octane, dodecane, cyclohexane, and mixtures thereof, can be used as diluents if desired.

Although the ratio of the rhodium catalysts to polyolefin can vary over a wide range, the catalysts generally are used in an amount sufficient to provide about 0.00002 to about 0.1 gram-atom of rhodium per mol of polyolefin, preferably about 0.0002 to about 0.01 gram-atom of rhodium per mol of polyolefin. The mol ratio of alcohol to polyolefin can vary over a broad range, but generally will be within the range of about 2:1 to about 100:1, usually being within the range of about 5:1 to about 70:1.

The carbon monoxide is generally employed in an amount sufficient to maintain a pressure within the range of about 700 p.s.i.g. to about 10,000 p.s.i.g. at the operating temperature, preferably being employed in an amount sufficient to maintain a pressure within the range of about 1000 p.s.i.g. to about 5000 p.s.i.g. at the operating temperature. The reaction temperature can vary over a wide range, but generally will be within the range of about 90° C. to about 300° C., usually being within the range of about 120° C. to about 250° C. The reaction time can vary over a wide range, depending in part on the reaction temperature, but generally will be within the range of about 1 minute to about 3 days, usually being within the range of about 30 minutes to about 1 day. The presently preferred reaction time ranges from 1–8 hours.

The process of the invention can be carried out as continuous or batch operations. The esters produced can be separated from the reaction mixture by conventional procedures such as distillation, extraction, crystallization, and the like.

In operation, the process of the invention is practiced, for example, by charging one or more of the described catalysts, one or more reactants comprising polyolefins, and one or more monohydric, dihydric and/or trihydric saturated alcohols to a reactor in any desired order. The system is purged with carbon monoxide to remove air, and is then pressured to the desired reaction level with carbon monoxide. Reactor contents are stirred and heated to reaction temperature where they are maintained for the required length of time to effect conversion of the reactants. The course of the reaction can be followed by monitoring the pressure drop within the reactor.

After venting the reactor of the unconverted carbon monoxide, the product mixture is subjected to distillation to remove unconverted reactants, and the product residue can be separated by one or more conventional techniques to obtain pure products.

The esters prepared by the process of this invention are useful for various commercial purposes. Uses for the unsaturated esters include their utilization in many applications such as the production of polymers, e.g., polyesters.

The following examples illustrate the conversion of polyolefins to esters in accordance with the invention.

EXAMPLE I

A 500 ml. stirred autoclave was charged with 0.07 g. (0.00013 mol) of bis(1,5-cyclooctadiene)-μ,μ'-diacetatodirhodium, 40 ml. of reagent grade methanol (1 mol) and 5 g. (0.09 mol) of special purity 1,3-butadiene. The system was pressured to 2000 p.s.i.g. with commercial grade carbon monoxide and subsequently heated to 300° F. (149° C.) for 2 hours. After cooling, the reaction mixture was diluted with H₂O and the aqueous solution extracted with pentane. From the pentane extract, there was recovered 0.6 g. of methyl pentenoates as determined by gas-liquid chromatographic analysis of the pentane extract as compared with an authentic sample prepared independently. An undetermined amount of dicarbomethoxybutenes was produced.

EXAMPLE II

A 500 ml. stirred autoclave was charged with 0.6 g. (0.0011 mol) of bis(1,5-cyclooctadiene)-$\mu,\mu'$-diacetatodirhodium, 200 ml. of reagent grade methanol (5 mols) and about 15.5 g. (0.3 mol) of special purity 1,3-butadiene. The system was then heated to 200° F. (93° C.) and pressured to 2500 p.s.i.g. with commercial grade carbon monoxide. The system was maintained at these conditions for about 22 hours. After cooling, the contents of the reactor were distilled to recover 1.4 g. of methyl pentenoates, identified by gas-liquid chromatography. An undetermined amount of dicarbomethoxybutenes was produced. About 12 g. of viscous polymer was formed.

EXAMPLE III

A 500 ml. stirred autoclave was charged with 0.75 g. (0.0014 mol) of bis(1,5-cyclooctadiene)-$\mu,\mu'$-diacetatodirhodium and 200 ml. (5 mols) of reagent grade methanol. The system was heated to 300° F. (149° C.) and pressurized to 2900 p.s.i.g. with commercial grade carbon monoxide. Subsequently, 50 g. (0.9 mol) of 1,3-butadiene (special purity) was added to the system and allowed to react for about 6 hours. After cooling, the catalyst residue was filtered from the material, and the filtrate was distilled to remove methanol and recover the reaction products. In this fashion there were recovered:

| | G. |
|---|---|
| Methyl pentenoates | 31.4 |
| Dicarbomethoxybutenes | [1] 7.1 |
| Polymeric residue | 11.5 |

[1] This fraction was hydrogenated and identified as dimethyl adipate, by comparison with an authentic sample prepared independently.

EXAMPLE IV

A 1000 ml. stirred autoclave was charged with 0.05 g. (0.000093 mol) of bis(1,5-cyclooctadiene)-$\mu,\mu'$-diacetatodirhodium, 200 ml. of methanol, and 5 g. (0.09 mol) of 1,3-butadiene. The system was pressured to 2000 p.s.i.g. with commercial grade carbon monoxide and subsequently heated to 300° F. (149° C.) for 1 hour. The reactor contents were recovered, and the product comprising methyl pentenoates and dicarbomethoxybutenes was concentrated to about 10 ml. by distillation. To the concentrate was added 0.1 g. of platinum dioxide, after which the concentrate was hydrogenated by shaking under about 20 p.s.i.g. hydrogen for approximately 3 hours at room temperature (about 25° C.). The liquid was decanted from the catalyst and then diluted with about 20 ml. of water, after which it was extracted with ether. Evaporation of ether from the ether extract gave 0.37 g. of residue which was found by gas chromatographic analysis to contain 85 weight percent methyl pentenoate, 11 weight percent dicarbomethoxybutanes, and 4 weight percent material of higher molecular weight.

EXAMPLE V

A 1000 ml. stirred autoclave was charged with 0.04 g. (0.000081 mol) of bis(1,5-cyclooctadiene)-$\mu,\mu'$-dichlorodirhodium, 150 ml. of methanol, and 5 g. (0.09 mol) of 1,3-butadiene. The system was pressured to 2000 p.s.i.g. with carbon monoxide and subsequently heated to 300° F. (149° C.) for 6 hours. The reactor contents were recovered, and the product comprising methyl pentenoates and dicarbomethoxybutenes was concentrated to about 10 ml. by distillation. To the concentrate was added 0.1 g. of platinum dioxide, after which the concentrate was hydrogenated by shaking under about 20 p.s.i.g. hydrogen at room temperature (about 25° C.) for approximately 4 hours. The liquid was decanted from the catalyst and then diluted with about 20 ml. of water. The resulting diluted mixture was extracted with ether. Evaporation of ether from the ether extract gave 0.57 g. of residue which was found by gas chromatographic analysis to contain 1 weight percent methyl pentanoates, 33 weight percent dicarbomethoxybutanes, and 66 weight percent material of higher molecular weight.

We claim:

1. A process for the production of unsaturated mono- and diesters which comprises reacting
   (a) a polyolefinically unsaturated hydrocarbon containing at least two carbon to carbon double bonds, at least two of which are conjugated, with
   (b) carbon monoxide, and
   (c) at least one hydroxylic compound selected from saturated hydrocarbyl and aryl-substituted saturated hydrocarbyl alcohols containing up to three hydroxyl groups in the presence of
   (d) a bridged organo dirhodium complex catalyst of the general formula

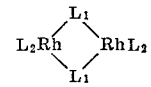

wherein $L_1$ is an anionic bridging ligand selected from thiocyanato, arenethiolato containing from 6 to 10 carbon atoms, alkanethiolato containing from 1 to 6 carbon atoms, oxalato, acetato, propionato, acetylacetonato, cyano, cyanato, chloro, bromo, and iodo, and $L_2$ is selected from carbon monoxide and olefinic hydrocarbons containing from 2 to 12 carbon atoms.

2. A process according to claim 1 wherein $L_1$ is selected from acetato, propionato, chloro, bromo, and iodo.

3. A process according to claim 1 wherein the temperature is within the range of 90 to 300° C. and the pressure is within the range of from about 700 to about 10,000 p.s.i.g.

4. A process according to claim 1 wherein said polyolefinically unsaturated hydrocarbon contains from 4 to 20 carbon atoms per molecule and has one conjugated carbon to carbon double bond in the alpha position.

5. A process according to claim 3 wherein the mol ratio of catalyst to polyolefin is in the range 0.00002 to 0.1 gram-atom of rhodium per mol of polyolefin and the mol ratio of the alcohol to polyolefin is in the range of about 2:1 to 100:1.

6. A process according to claim 1 for the production of methyl pentenoate and dicarbomethoxybutenes wherein (a) is butadiene and (d) is bis(1,5-cyclooctadiene)-$\mu,\mu'$-diacetatodirhodium or bis(1,5-cyclooctadiene)-$\mu,\mu'$-dichlorodirhodium, and said reacting is carried out at a temperature in the range 90–300° C. for a period of time sufficient to form said methyl pentenoates and dicarbomethoxybutenes.

References Cited
UNITED STATES PATENTS 3,437,676  4/1969  Kutepow et al. _____ 260—486

LORRAINE A. WEINBERGER, Primary Examiner

E. J. SKELLY, Assistant Examiner

U.S. Cl. X.R.

260—410.6, 410.9 R, 468 M, 485 G, 485 L, 486 AC